(12) United States Patent
Thomas et al.

(10) Patent No.: US 7,365,146 B2
(45) Date of Patent: Apr. 29, 2008

(54) SUBSTITUTED POLYPHENYLENES VIA SUPPORTED TRANSITION METAL CATALYSIS

(75) Inventors: David B. Thomas, Long Beach, MS (US); Nikica Maljkovic, New Orleans, LA (US); Robert R. Gagné, Diamondhead, MS (US)

(73) Assignee: Solvay Advanced Polymers, LLC, Alpharetta, GA (US)

( * ) Notice: Subject to any disclaimer, the term of this patent is extended or adjusted under 35 U.S.C. 154(b) by 51 days.

(21) Appl. No.: 11/045,416

(22) Filed: Jan. 27, 2005

(65) Prior Publication Data

US 2005/0197454 A1 Sep. 8, 2005

Related U.S. Application Data

(60) Provisional application No. 60/539,927, filed on Jan. 28, 2004.

(51) Int. Cl.
*C08G 61/00* (2006.01)
*C08G 61/10* (2006.01)

(52) U.S. Cl. .................. 528/86; 528/482; 528/488; 528/397; 528/491; 528/502 C; 528/503

(58) Field of Classification Search ........... 528/86, 528/482, 488, 397, 491, 502 C, 503
See application file for complete search history.

(56) References Cited

U.S. PATENT DOCUMENTS

| | | | |
|---|---|---|---|
| 4,326,989 A | 4/1982 | Colon et al. |
| 5,227,457 A | 7/1993 | Marrocco, III et al. |
| 5,565,543 A | 10/1996 | Marrocco, III et al. |
| 5,646,231 A | 7/1997 | Marrocco, III et al. |
| 5,646,232 A | 7/1997 | Marrocco, III et al. |
| 5,654,392 A | 8/1997 | Marrocco, III et al. |
| 5,659,005 A | 8/1997 | Marrocco, III et al. |
| 5,721,335 A | 2/1998 | Marrocco, III et al. |
| 5,731,400 A | 3/1998 | Marrocco, III et al. |
| 5,756,581 A | 5/1998 | Marrocco, III et al. |
| 5,760,131 A | 6/1998 | Marrocco, III et al. |
| 5,789,521 A | 8/1998 | Marrocco, III et al. |
| 5,824,744 A | 10/1998 | Gagné et al. |
| 5,830,945 A | 11/1998 | Gagné et al. |
| 5,886,130 A | 3/1999 | Trimmer et al. |
| 5,976,437 A | 11/1999 | Marrocco, III et al. |
| 6,512,083 B1 | 1/2003 | Woo et al. |
| 2002/0185635 A1 | 12/2002 | Doi et al. |
| 2002/0193532 A1 | 12/2002 | Ikehira et al. |

FOREIGN PATENT DOCUMENTS

| EP | 1245659 A1 | 10/2002 |
|---|---|---|
| EP | 1253180 A2 | 10/2002 |

OTHER PUBLICATIONS

Colon et al., "Coupling of Aryl Chlorides by Nickel and Reducing Metals," *J. Org. Chem.*, 1986, vol. 51, pp. 2627-2637.
Fanta, "The Ullmann Synthesis of Biaryls," *Synthesis*, Jan. 1974, vol. 9, pp. 9-21.
Fieser et al., *Reagents for Organic Synthesis*, 1967, vol. 1, cover page, pp. 390-392.
Suzuki, Organoborates in New Synthetic Reactions, *Acc. Chem. Res.*, 1982, vol. 15, pp. 178-184.
Mukhopadhyay et al., "Highly Chemoselective Heterogeneous Pd-Catalyzed Biaryl Synthesis from Haloarenes: Reaction in an Oil-in-Water Microemulsion," *Organic Process Research & Development*, 2003, vol. 7, pp. 641-643.
Mukhopadhyay et al., "Kinetics and Mechanism of Heterogeneous Palladium-Catalyzed Coupling Reactions of Chloroaryls in Water," *J. Chem. Soc.*, 1999, Perkin Trans. 2, pp. 2481-2484.
Mukhopadhyay et al., "Palladium-catalyzed Aryl-Aryl Coupling in Water Using Molecular Hydrogen: Kinetics and Process Optimization of a Solid-Liquid-Gas System," *Tetrahedron*, 1999, vol. 55, pp. 14763-14768.
Mukhopadhyay et al., "Regiospecific Cross-Coupling of Haloaryls and Pyridine to 2-Phenylpyridine Using Water, Zinc, and Catalytic Palladium on Carbon," *J. Chem. Soc.*, 2000, Perkin Trans. 2, pp. 1809-1812.
Yamamoto et al., "A Novel Type of Polycondensation of Polyhalogenated Organic Aromatic Compounds Producing Thermostable Polyphenylene Type Polymers Promoted by Nickel Complexes," *Chemistry Letters*, 1977, The Chemical Society of Japan, pp. 353-356.

*Primary Examiner*—Duc Truong
(74) *Attorney, Agent, or Firm*—Christie Parker & Hale, LLP.

(57) ABSTRACT

Substituted polyphenylenes and methods for producing such substituted polyphenylenes using supported transition metal catalysis are provided.

57 Claims, No Drawings

SUBSTITUTED POLYPHENYLENES VIA SUPPORTED TRANSITION METAL CATALYSIS

CROSS-REFERENCE TO RELATED APPLICATION(S)

This is an ordinary application of U.S. Provisional Application Ser. No. 60/539,927, filed on Jan. 28, 2004, the content of which is expressly incorporated herein by reference as if set forth in full herein.

FIELD OF THE INVENTION

The present invention is directed to a method/process for producing substituted polyphenylenes, and more particularly to a method for producing substituted polyphenylenes using supported transition metal catalysis.

BACKGROUND OF THE INVENTION

Phenylene polymers and copolymers exhibit a number of desirable properties including high strength and stiffness, solvent and corrosion resistance, and high use temperature. The polymers often have rigid backbone structures and can therefore be used to produce molecular composites as well. Polyphenylenes of significant molecular weight are exceedingly difficult to synthesize because the growing polymer molecules lose solubility and precipitate from the reaction solvent at a low degree of polymerization (DP).

A desired increase in the solubility of polyphenylenes has been achieved by incorporating pendant side groups on phenyl-based monomers, for example, as disclosed in U.S. Pat. Nos. 5,886,130; 5,227,457; 5,824,744; 5,830,945; and 5,976,437. Substituted polyphenylenes produced in accordance with the teachings of the above referenced patents have demonstrated many desirable mechanical properties.

The coupling of aryl compounds to form biaryl compounds or polyaryl compounds via carbon-carbon bonds is of great synthetic importance. A large number of methods are known to effect such couplings, including Ullman couplings of aryl iodides and bromides (see P. E. Fanta, "The Ullman Synthesis of Biaryls," Synthesis, 9, 9-21, 1974), coupling of aryl bromides and iodides with aryl boronic acids and esters using palladium catalysts (A. Suzuki, Acc. Chem. Res., 15, 178, 1982), reductive coupling of aryl halides with magnesium via Grignard reagents using nickel catalysts (T. Yamamoto and A. Yamamoto, Chem. Lett., 353-356, 1977), reductive coupling of aryl chlorides with zinc using nickel triphenylphosphine catalysts (I. Colon and D. R. Kelsey, J. Org. Chem., 51, 2627-2637, 1986; and U.S. Pat. No. 4,326,989) and oxidative coupling of phenols using iron (III) or air and copper catalysts (L. F. Fieser and M. Fieser, Reagents for Organic Synthesis, Vol. 1, 390, 1967).

Several reaction methods may be used to prepare substituted polyphenylenes via aryl coupling. The simplest rely on reductive condensation of 1,4-dihaloaromatics, either by way of a Grignard reagent, or directly in the presence of a reducing agent such as zinc metal. A catalyst, such as bis(triphenylphosphine) nickel (II) chloride or 1,4-dichloro-2-butene is used. Para-bromoaryl boronic acids may be coupled using palladium based catalysts. Polyphenylenes have also been prepared by methods which do not give exclusive para linkage, such as Diels-Alder condensation of bis-acetylenes and bis-pyrones, polymerization of 1,3-cyclohexadiene followed by aromatization, and oxidative polymerization of benzene.

Thus, a number of possible methods exist for the production of substituted polyphenylenes. The core technology for commercial polyphenylene synthesis is the metal catalyzed coupling of dihaloaryl species. For example, nickel-catalyzed coupling reactions have been described in several U.S. patents, including U.S. Pat. Nos. 5,227,457; 5,886,130; and 5,824,744; the disclosures of which are incorporated fully herein by reference.

Generally, this method uses a nickel catalyst to couple dihaloaryl species in conjunction with a triphenylphosphine (TPP) ligand and a zinc metal reducing agent in a polar aprotic solvent such as N,N-dimethyl acetamide DMAc or (NMP) N-methylpyrolidone. Such a reaction can be diagrammed as follows, where Y is a substituent and X is a halogen:

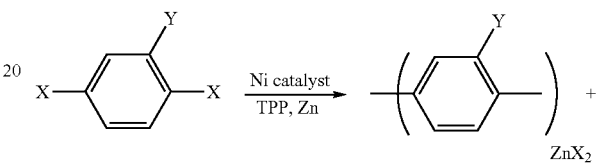

Although the above diagrammed method can produce commercial quantities of substituted polyphenylenes, several aspects of the process are undesirable from synthetic, manufacturing, and environmental standpoints.

First, in the nickel catalyzed process the reduction is heterogeneous in nature, involving a solid-liquid interface, where solid zinc particles must act as the reducing agents for the solvent based reaction. This process effectively renders the extent and rate of the reaction subject to factors such as zinc particle size, shape, and quality, which are difficult to control and monitor.

Second, commercially available zinc particles are partially coated with zinc oxide (ZnO), which must be removed to activate the zinc so that the substitution reaction can proceed efficiently. The zinc activation process has a number of drawbacks. For example, mechanical removal of the ZnO coating leaves ZnO particles behind as an impurity, and chemical removal results in various byproducts. For instance, one zinc activation method utilizes hydrochloric acid (HCl), which is highly corrosive and toxic and produces explosive hydrogen gas as a by-product.

Third, nickel itself is a known carcinogen, forcing manufacturers to follow a number of expensive and time-consuming environmental and safety regulations.

Fourth, the catalyst package requires the use of a substantial excess of the TPP ligand with respect to the catalyst for the reaction to proceed efficiently. TPP is expensive and is presently unrecoverable; thus, increasing the cost of the process.

Fifth, the reaction is very water sensitive. For example, generally acceptable amounts of water are typically below 50 ppm. But, the polar aprotic solvents used in the process are highly hygroscopic creating substantial manufacturing and operating challenges.

Although not directed to producing substituted polyphenylenes, a number of recent studies have suggested novel pathways of coupling aryl compounds to form biaryls. Examples include publications to Mukhopadhyay, et al. (J. Chem. Soc., Perkin Trans. 2, 1999, 2481-2484); (Organic Process Research and Development, 7, 2003, 641); (Tetrahedron, 55, 1999, 14763); and (J. Chem. Soc., Perkin Trans., 2, 2000, 1809-1812), the disclosures of which are incorporated herein by reference.

Broadly, these new pathways employ supported metal catalysts such as palladium on carbon substrate, Pd(C), or rhodium on carbon substrate, Rh(C), to accomplish aryl-aryl coupling. In such pathways the starting materials are still haloaryls, and a number of common reducing agents have been employed for catalyst regeneration, including, for example, zinc, formate-salts, and hydrogen gas. The solid-liquid reaction is often assisted by a phase transfer catalyst such as polyethylene glycol (PEG). Significantly, these reactions are generally tolerant of water and air allowing less stringent reaction conditions, and may optionally be conducted in waterborne systems.

Reactions involving heterogeneous catalysts, for example, palladium on carbon, Pd(C), have been employed to produce biphenyls from monohaloaryl molecules. Unfortunately, conversion of the monohaloaryl species in these reactions leads to the uncontrolled production of two products; 1) the desirable coupling of haloaryl molecules, for example, two chlorobenzene molecules couple to form a biphenyl molecule, and 2) the undesirable reduction of the haloaryl species, for example, chlorobenzene being reduced to benzene. A representative reaction scheme showing both the desired coupling product and the undesired reduction product is given below, where X represents a halogen and Y represents one or more substituents.

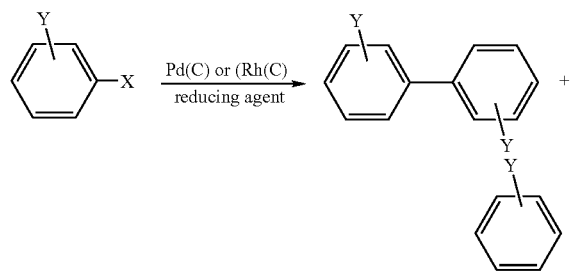

In principle, supported metal catalysts such as Pd(C) and Rh(C) could be used to produce substituted polyphenylenes from corresponding dihalobenzenes. In order for such a step-growth synthesis to produce polymers having sufficiently high molecular weight to exhibit useful mechanical properties, the coupling efficiency of the reaction has to be vastly predominant over the reduction of the functional halo substituents. Otherwise, the reaction terminates (by reduction) before the growing polymer chains have become long enough to impart useful properties to the product material.

For example, the highest reported coupling efficiency of the Pd(C) or Rh(C) catalyzed process is 93%. Consequently, in such a reaction fully 7% of the monohaloaryl species is reduced. This degree of coupling among dihaloaryl molecules would correspond to an average degree of polymerization ($D_p$) of only 10 to 20. However, optimal properties of polyphenylenes are only obtained when the $D_p$ is greater than 50, and preferably greater than 100. Therefore, based on the results reported in the literature, heterogeneous metal catalysts appear insufficient to produce high molecular weight substituted polyphenylenes.

Accordingly, a need exists for a new, efficient, environmentally friendly, cost-effective method for the production of substituted polyphenylenes.

SUMMARY OF THE INVENTION

The present invention is directed to methods for producing high molecular weight substituted polyphenylenes using heterogeneous supported metal catalysts.

In one embodiment, the method includes reacting a dihaloaryl or polyhaloaryl species in a reaction mixture comprising a solvent and at a selected temperature and pressure in the presence of a supported transition metal catalyst to effect the formation of carbon-carbon bonds between aryl species at the point of former halogen attachment to thereby form a polyphenylene polymer.

The methods of the present invention can utilize phase transfer catalysts without reaction terminating acidic protons.

Additionally, the methods of the present invention can utilize side groups, such as aryl substituents, to impart solubility to the growing substituted polyphenylene chains, thus allowing the polymerization reaction to proceed to relatively high molecular weight.

DETAILED DESCRIPTION OF THE INVENTION

The present invention is directed to methods for producing high molecular weight substituted polyphenylenes using supported transition metal catalysts.

The meanings of the following terms and phrases are set forth below:

The term "substituted polyphenylene" as used herein refers to a polymer comprising a phenylene backbone and comprising a sufficient number of solubilizing groups such that the polymer is soluble in a suitable solvent. The more general term polyphenylenes should be read to include substituted polyphenylenes.

"Solubilizing groups" are functional groups which, when attached as side chains to the polymer in question, will render it soluble in an appropriate solvent system.

A "heterogeneous catalyst" is a catalyst that exists in a separate phase from the reaction medium.

A "supported metal catalyst" comprises a metal suitable for catalyzing a reaction attached to the surface of an inert solid substrate material.

A "haloaryl species" comprises one or more halogen atoms covalently bonded to an aryl ring. Monohaloaryl refers to an aryl species with one attached halogen atom, dihaloaryl refers to an aryl species with two attached halogen atoms, and polyhaloaryl refers to an aryl species with two or more halogen atoms attached in any arrangement.

The halogen atom or atoms of a haloaryl species may be fluorine, bromine, iodine, or preferably chlorine. Sites of halogen attachment are the reactive sites for the transition metal catalyzed aryl coupling of the inventive polymerization method. Therefore, a dihaloaryl species, for example, is a monomer for the formation of a polyphenylene based polymer. The halogen atoms of the dihaloaryl type monomer may be attached para or meta with respect to one another, but may not be attached in an ortho orientation. Regarding a polyhaloaryl species, the halogen atoms may be attached to the aromatic (aryl) ring in any arrangement. All of the halogens of a polyhaloaryl species need not react in order to achieve polymerization.

A "phase transfer catalyst" (PTC), refers to a molecular species that promotes a reaction which takes place at an interface or interphase. In the case of a supported metal catalyzed polymerization, the PTC acts at the interface of the solid catalyst and the liquid reaction medium.

The inventive polymerization method herein disclosed may or may not include a phase transfer catalyst (PTC). Where a PTC is employed, preference is given to a PTC that does not contain acidic protons, as such protons may undesirably terminate the reaction. Preferred PTCs include, but are not limited to, ethers such as polyethylene glycol, glymes, polyglycols, crown ethers, and the like; quaternary ammonium salts such as benzyltrimethylammonium halides, benzyltriethylammonium halides, benzyltripropylammonium halides, benzyltributylammonium halides, tetramethylammonium halides, tetraethylammonium halides, tetrapropylammonium halides, tetrabutylammonium halides, triethylbutylammonium halides, tributylethylammonium halides, trimethylhexadecylammonium halides, tetrahexylammonium halides, benzyldimethylalkylammonium halides, cetyltrimethylammonium halides, dimethyldiallylammonium halides, cetylpyridinium halides, laurylpyridinium halides, and the like; phosphonium salts such as ethyltriphenylphosphonium halides, butyltriphenylphosphonium halides, methyltriphenylphosphonium halides, tetrabutylphosphonium halides, tetraphenylphosphonium halides, benzyltriphenylphosphonium halides, and the like; and other phase transfer agents known to those skilled in the art so long as they do not interfere with the reaction (e.g., they do not have acidic protons which leads to reaction termination).

Suitable metal catalysts include, but are not limited to, Fe, Ru, Co, Rh, Ir, Ni, Pd, Pt, Cu, and other transition metal catalysts familiar to those skilled in the art. Catalyst concentrations between 0.01 mol % and 100 mol % are preferred. The catalyst concentration is relative to the number or moles of halogen atoms attached to the aryl monomer units. Thus, 100 mol% catalyst refers to a stoichiometric quantity of catalyst atoms relative to reactive halogen atoms. Use of a reducing agent serves to regenerate the catalyst, thereby allowing lower catalyst concentrations to be effective in the reaction.

Possible catalyst supports include, but are not limited to, carbon, silica, silica gel, polymeric supports, hydrous metal oxides, crystalline titanates, ceramic supports, alumina, silica-alumina, molecular sieves, and other supports familiar to those skilled in the art.

Suitable reducing agents include, but are not limited to, formate salts, hydrogen gas, Zn, Mg, Mn and other suitable metals, and other reducing agents familiar to those skilled in the art. In addition, other methods of reduction may be used such as electrochemical reduction.

The inventive method of substituted polyphenylene production may or may not include the addition of a base to the reaction. Where a base is used, suitable bases include, but are not limited to, pyridine, hydroxide salts, tertiary amines, hydride salts, carbonate salts, and other bases familiar to those skilled in the art that do not form substantially acidic conjugate acids. Increasing base concentration will increase reaction rate up to a maximum that depends on the catalyst and substrate concentration.

The coupling reaction takes place in solution or suspension in a stirred reactor at temperatures preferably ranging from about 0° C. to about 250° C., more preferably from about 25° C. to about 200° C., and most preferably from about 60° C. to about 150° C.

Pressure is not critical to the inventive method; therefore, superatmospheric or subatmospheric pressures can be used as well as atmospheric pressure. Where a gas is used as the reducing agent, pressure may affect the concentration of the reducing agent, so it may be desirable to use a mixture of an inert gas and reducing gas.

Reaction time is not critical as many reactions are complete in less than 2 hours. The reaction temperature, and the presence of base will affect reaction time with faster reactions generally occurring at higher temperatures and increased base concentration. There are no maximum times since the reaction is essentially irreversible.

Agitation speed is important in that it must be sufficiently high to effectively suspend the supported catalyst. The absolute agitation speed will be reactor dependent, but there is no maximum speed above which the reaction becomes less efficient.

The reaction solvent should be selected so that the resulting polymer is soluble in the reaction medium. Suitable solvents include polar aprotic solvents such as dimethyl acetamide (DMAc), dimethyl formamide, N-methylpyrrolidinone (NMP), dimethylsulfoxide, sulfolane, and the like; aromatic solvents such as toluene, benzene, xylenes and the like; aliphatic hydrocarbons including pentanes, hexanes, dodecanes and the like; saturated aliphatic and cycloaliphatic ethers such as diethyl ether, diglyme, tetrahydrofuran and the like; aromatic ethers such as diphenyl ether, and the like; water; homogeneous mixtures of solvents; and heterogeneous solvent mixtures including suspensions, emulsions, mini-emulsions, and micro-emulsions where said heterogeneous systems may be stabilized by suitable surfactants known to those skilled in the art so long as said surfactants do not interfere with the reaction system (i.e., surfactants that are not acidic or deactivate the catalyst). Thus, the solvent systems useful for preparation of the substituted polyphenylenes according to the present invention can be one-phase, for example, an NMP-water system; or two-phase, for example, a phenyl-ether/water system.

The method according to the present invention relies on keeping the growing polyphenylene polymeric chains in solution to achieve the necessary high molecular weights. In this regard, there are several procedures that can be used in accordance with practice of the present invention. The employment of solubilizing groups (aryl substituents) to solubilize growing polyphenylene polymeric chains has been disclosed in several US patents, for example, in U.S. Pat. Nos. 5,227,457, 5,646,231, and 5,721,335 the disclosures of which are incorporated fully herein by this reference.

The present invention provides for the formation of soluble polyphenylene polymers comprising solubilizing side groups attached to the polyphenylene polymer backbone. As disclosed in the above-referenced patents, a vast variety of arrangements and types of solubilizing groups are known providing a large number of possible monomers for the inventive polymerization. More than one dihaloaryl or polyhaloaryl species may be included in a given polymerization, thus forming a copolymer having two or more repeat units. All dihaloaryl and polyhaloaryl monomer species need not contain solubilizing groups. For example, one could copolymerize a dihaloaryl monomer having a pendant solubilizing group such as 2,5-dichlorobenzophenone with a second dihaloaryl monomer lacking a solubilizing group such as 1,3-dichlorobenze. The mole fraction of the species having the solubilizing group must be sufficiently great to prevent polymer precipitation from the reaction medium until the desired degree of polymerization is achieved.

Certain solubilizing aryl substituents that were not compatible with prior art reaction systems may be incorporated pendant to the polymer backbone using the methods provided in accordance with practice of the present invention. For example, polyphenylenes having solubilizing groups comprising ether linkages may surprisingly be prepared by the method disclosed herein. A general example of such a polymer is represented below, where R is alkyl, aryl, alkaryl, aralkyl, alkyl or aryl amide, aryl ketone, alkoxy, polyalkeneoxy, polyphenylene oxide, polyphenylene sulfide, polystyrene, polyvinyl chloride, polyalkylmethacrylate, polyadrylonitrile, polyalkylvinyl ether, polyvinyl alcohol, polyvinyl acetate, perfluoroalkyl, perfluoroalkoxy, polyester, polyamide, polyimide, polyfluoroalkyl, polyfluoroaryl, polyfluoroalkoxy, sulfonamide, aryl ester, alkyl ester, sulfonate ester, alkyl sulfonate, aryl sulfone.

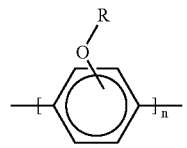

The polymerization method provided in accordance with the present invention is water tolerant and may additionally be conducted in protic solvents. For protic solvents, e.g. water or alcohols, ionizable side groups, e.g. pyridyl or sulfonate, might be utilized to impart solubility to the growing polymer molecules.

Also, additional monomers may be polymerized by the inventive method because higher reaction temperatures are possible. For example, certain monomers that were insoluble at the prior art reaction temperatures will be soluble at higher temperatures and can be polymerized using the supported metal catalyst method.

Using the supported metal catalyst method provided in accordance with practice of the present invention leads to a number of advantages, including:

(1) The solid zinc reducing agent is eliminated. In the method herein disclosed, a dissolved reducing agent (e.g., a formate salt or preferably hydrogen gas) may be used, which eliminates the liquid-solid interface, rendering the reaction more controllable. The elimination of the expensive zinc powders reduces cost, and eliminates the need for the activation step;
(2) The use of carcinogenic nickel is eliminated.
(3) The use of TPP or other solubilizing ligands is eliminated, significantly reducing the material cost of the process;
(4) The supported metal catalyst is recyclable allowing for the overall reduction in the cost of the process and the amount of waste produced; and
(5) The reaction tolerates both air and water thereby reducing the manufacturing cost and operating complexities of the process.

EXAMPLES

These and other features and advantages of the present invention as described in the summary of the invention and detailed description will be better understood by reference to the following examples.

Example 1

In a 1 L flask, 30 g (120 mmol) of 2,5-dichlorobenzophenone, 3.09 g (21 mmol) of m-dichlorobenzene, 33.75 g (1350 mmol) NaOH, 7.0 g polyethylene glycol, and 1.6 g of 10% w/w Pd/C are combined with 250 mL of NMP:toluene (1:1 v/v) and 250 ml $H_2O$. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 2

In a 1 L flask, 30 g (120 mmol) of 2,5-dichlorobenzophenone, 3.09 g (21 mmol) of m-dichlorobenzene, 33.75 g (1350 mmol) NaOH, 2.0 g cetyltrimethylammonium bromide, and 1.6 g of 10% w/w Pd/C are combined with 250 ml of NMP:toluene (1:1 v/v) and 250 mL $H_2O$. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 3

In a 500 mL flask, 30 g (120 mmol) of 2,5-dichlorobenzophenone, 3.09 g (21 mmol) of m-dichlorobenzene, 174.5 g (1350 mmol) N,N-diisopropylethylamine, 2.0 g cetyltrimethylammonium bromide, and 1.6 g of 10% w/w Pd/C are combined with 250 ml of NMP:toluene (1:1 v/v). The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 4

In a 500 mL flask, 30 g (120 mmol) of 2,5-dichlorobenzophenone, 3.09 g (21 mmol) of m-dichlorobenzene, 136.6 g (1350 mmol) triethylamine, 2.0 g cetyltrimethylammonium bromide, and 1.6 g of 10% w/w Pd/C are combined with 250 ml of NMP:toluene (1:1 v/v). The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 5

In a 500 mL flask, 30 g (120 mmol) of 2,5-dichlorobenzophenone, 3.09 g (21 mmol) of m-dichlorobenzene, 136.6 g (1350 mmol) triethylamine, 2.0 g cetyltrimethylanmnonium bromide, and 1.6 g of 10% w/w Pd/C are combined with 250 ml of anisole. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 6

In a 500 mL flask, 30 g (120 mmol) of 2,5-dichlorobenzophenone, 3.09 g (21 mmol) of m-dichlorobenzene, 2.0 g cetyltrimethylammonium bromide, and 1.6 g of 10% w/w Pd/C are combined with 250 ml of NMP:toluene (1:1 v/v). The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 7

In a 500 mL flask, 30 g (120 mmol) of 2,5-dichlorobenzophenone, 3.09 g (21 mmol) of m-dichlorobenzene, 2.0 g cetyltrimethylammonium bromide, and 1.6 g of 10% w/w Pd/C are combined with 250 ml of NMP:toluene (1:1 v/v). The reaction is stirred vigorously with an overhead stirrer at 100 C for 20 min under $N_2$. After 20 min a solution of 5.33 g (141 mmol) sodium borohydride in 180 mL of NMP is added at a rate of 1 mL/min for the next 3 hours, after which the solution is filtered, poured into acetone (4:1 v/v ratio acetone:reaction mixture) with vigorous stirring to coagulate the resulting polymer. The product is isolated by filtration.

Example 8

In a 500 mL flask, 30 g (120 mmol) of 2,5-dichlorobenzophenone, 3.09 g (21 mmol) of m-dichlorobenzene, 136.6 g (1350 mmol) triethylamine, 2.0 g cetyltrimethylammonium bromide, and 1.6 g of 10% w/w Pd/C are combined with 250 ml of NMP. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 9

In a 1 L flask, 30 g (120 mmol) of 2,5-dichlorobenzophenone, 3.09 g (21 mmol) of m-dichlorobenzene, 33.75 g (1350 mmol) NaOH, 2.0 g cetyltrimethylammonium bromide, and 1.6 g of 10% w/w Pd/C are combined with 250 ml of NMP:toluene (1:1 v/v) and 250 mL of $H_2O$. The reaction is stirred vigorously with an overhead stirrer at 100° C. for 20 min under $N_2$. After 20 min a solution of 9.60 g (141 mmol) sodium formate in 180 mL of $H_2O$ is added at a rate of 1 mL/min for the next 3 hours, after which the solution is filtered, poured into acetone (4:1 v/v ratio acetone:reaction mixture) with vigorous stirring to coagulate the resulting polymer. The product is isolated by filtration.

Example 10

In a 500 mL flask, 30 g (120 mmol) of 2,5-dichlorobenzophenone, 3.09 g (21 mmol) of m-dichlorobenzene, 136.6 g (1350 mmol) triethylamine, 2.0 g cetyltrimethylammonium bromide, and 1.6 g of 10% w/w Pd/C are combined with 250 ml of NMP. The reaction is stirred vigorously with an overhead stirrer at 100° C. for 20 min under $N_2$. After 20 min a solution of 9.60 g (141 mmol) sodium formate in 180 mL of $H_2O$ is added at a rate of 1 mL/min for the next 3 hours, after which the solution is filtered, poured into acetone (4:1 v/v ratio acetone:reaction mixture) with vigorous stirring to coagulate the resulting polymer. The product is isolated by filtration.

Example 11

In a 500 mL flask, 30 g (120 mmol) of 2,5-dichlorobenzophenone, 3.09 g (21 mmol) of m-dichlorobenzene, 136.6 g (1350 mmol) triethylamine, and 1.6 g of 10% w/w Pd/C are combined with 250 ml of NMP. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 12

In a 500 mL flask, 30 g (120 mmol) of 2,5-dichlorobenzophenone, 3.09 g (21 mmol) of m-dichlorobenzene, and 1.6 g of 10% w/w Pd/C are combined with 250 ml of pyridine. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 13

In a 500 mL flask, 30 g (120 mmol) of 2,5-dichlorobenzophenone, 3.09 g (21 mmol) of m-dichlorobenzene, 2.0 g cetyltrimethylammonium bromide, and 1.6 g of 10% w/w Pd/C are combined with 250 ml of pyridine. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1v/v ratio acetone:reaction mixture) with vigorous stirring to coagulate the resulting polymer. The product is isolated by filtration.

Example 14

In a 1 L flask, 30 g (120 mmol) of 2,5-dichlorobenzophenone, 3.09 g (21 mmol) of m-dichlorobenzene, 186.6 g (1350 mmol) potassium carbonate, 2.0 g cetyltrimethylammonium bromide, and 1.6 g of 10% w/w Pd/C are combined with 250 ml of NMP:toluene (1:1 v/v) and 250 mL $H_2O$. The reaction is stirred vigorously with an-overhead stirrer at 100° C. for 20 min under $N_2$. After 20 min a solution of 9.60 g (141 mmol) sodium formate in 180 mL of $H_2O$ is added at a rate of 1 mL/min for the next 3 hours, after which the solution is filtered, poured into acetone (4:1 v/v ratio acetone:reaction mixture) with vigorous stirring to coagulate the resulting polymer. The product is isolated by filtration.

Example 15

In a 1 L flask, 30 g (120 mmol) of 2,5-dichlorobenzophenone, 3.09 g (21 mmol) of m-dichlorobenzene, 186.6 g (1350 mmol) potassium carbonate, 2.0 g cetyltrimethylammonium bromide, and 1.6 g of 10% w/w Pd/C are combined with 250 ml of anisole and 250 mL of $H_2O$. The reaction is stirred vigorously with an overhead stirrer at 100° C. for 20 min under $N_2$. After 20 min a solution of 9.60 g (141 mmol) sodium formate in 180 mL of $H_2O$ is added at a rate of 1 mL/min for the next 3 hours, after which the solution is filtered, poured into acetone (4:1 v/v ratio acetone:reaction mixture) with vigorous stirring to coagulate the resulting polymer. The product is isolated by filtration.

Example 16

In a 1 L flask, 30 g (120 mmol) of 2,5-dichlorobenzophenone, 3.09 g (21 mmol) of m-dichlorobenzene, 186.6 g (1350 mmol) potassium carbonate, 2.0 g cetyltrimethylammonium bromide, and 1.6 g of 10% w/w Pd/C are combined with 250 ml of NMP:toluene (1:1 v/v) and 250 mL of $H_2O$. The reaction is stirred vigorously with an overhead stirrer at 100° C. for 20 min under $N_2$. After 20 min a solution of 6.5 g (141 mmol) ethanol in 180 mL of $H_2O$ is added at a rate of 1 mL/min for the next 3 hours. The solution is then filtered and then coagulated in acetone to isolate the polymer.

Example 17

In a 1 L flask, 30 g (120 mmol) of 2,5-dichlorobenzophenone, 3.09 g (21 mmol) of m-dichlorobenzene, 186.6 g (1350 mmol) potassium carbonate, 2.0 g cetyltrimethylammonium bromide, and 1.6 g of 10% w/w Pd/C are combined with 250 ml of NMP:toluene (1:1 v/v) and 250 mL of $H_2O$. The reaction is stirred vigorously with an overhead stirrer at 100° C. for 20 min under $N_2$. After 20 min a solution of 8.47 g (141 mmol) 2-propanol in 180 mL of $H_2O$ is added at a rate of 1 mL/min for the next 3 hours. The solution is then filtered and then coagulated in acetone to isolate the polymer.

Example 18

In a 1 L flask, 28.7 g (120 mmol) of 2,5-dichlorodiphenylether, 3.09 g (21 mmol) of m-dichlorobenzene, 33.75 g (1350 mmol) NaOH, 7.0 g polyethylene glycol, and 1.6 g of 10% w/w Pd/C are combined with 250 mL of NMP:toluene (1:1 v/v) and 250 ml $H_2O$. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

Example 19

In a 1 L flask, 30 g (120 mmol) of 2,5-dichlorobenzophenone, 3.09 g (21 mmol) of m-dichlorobenzene, 33.75 g (1350 mmol) NaOH, 7.0 g polyethylene glycol, and 1.55 g of 10% w/w Rh/C are combined with 250 mL of NMP:toluene (1:1 v/v) and 250 ml $H_2O$. The reaction is stirred vigorously with an overhead stirrer at 100° C. for 20 min under $N_2$. After 20 min a steady flow of $H_2$ is initiated. The reaction is allowed to continue for an additional 3 hours after which the solution is filtered, poured into acetone (4:1 v/v ratio acetone:reaction mixture) with vigorous stirring to coagulate the resulting polymer. The product is isolated by filtration.

The above descriptions of exemplary embodiments of substituted polyphenylenes and methods for producing such substituted polyphenylenes are illustrative of the present invention. Because of variations which will be apparent to those skilled in the art, however, the present invention is not intended to be limited to the particular embodiments described above. The scope of the invention is defined in the following claims:

What is claimed is:

1. A method for producing substituted polyphenylene polymers comprising:
reacting dihaloaryl or polyhaloaryl species in a reaction mixture comprising a solvent and at a selected temperature and pressure in the presence of a supported transition metal catalyst to effect the formation of carbon-carbon bonds between aryl species at the point of former halogen attachment to thereby form a polyphenylene polymer or copolymer, wherein the reaction takes place in the presence of a phase transfer catalyst.

2. The method of claim 1 further comprising reacting the dihaloaryl or polyhaloaryl species in the presence of a reducing agent to effect catalyst regeneration.

3. The method of claim 2 wherein the reducing agent is selected from the group consisting of formate salts, hydrogen gas, Zn, Mg, and Mn.

4. The method of claim 1 wherein in the reaction proceeds via electrochemical reduction.

5. The method of claim 1 wherein the transition metal comprising the supported transition metal catalyst is selected from the group consisting of Fe, Ru, Co, Rh, Ir, Ni, Pd, Pt, and Cu.

6. The method of claim 1 wherein the catalyst support comprises a material selected from the group consisting of carbon, silica and polymeric materials.

7. The method of claim 1 wherein the catalyst concentration is between 0.01 mol % and 100 mol %.

8. The method of claim 1 wherein the catalyst concentration is between 0.1 mol % and 75 mol %.

9. The method of claim 1 wherein the catalyst concentration is between 0.25 mol % and 50 mol %.

10. The method of claim 1 wherein the catalyst concentration is between 0.5 mol % and 25 mol %.

11. The method of claim 1 wherein the catalyst concentration is between 0.75 mol % and 10 mol %.

12. The method of claim 1 wherein the catalyst concentration is between 1 mol % and 5 mol %.

13. The method of claim 1 wherein the growing polyphenylene polymer is kept in solution by means of solubilizing groups pendant to the polyphenylene polymer backbone.

14. The method of claim 1 wherein the phase transfer catalyst is a quaternary ammonium salt.

15. The method of claim 1 where the phase transfer catalyst is a phosphonium salt.

16. The method of claim 1 where the phase transfer catalyst does not contain acidic protons.

17. The method of claim 1 wherein the reaction mixture includes a base.

18. The method of claim 17 wherein the base is pyridine.

19. The method of claim 17 wherein the base is a hydroxide salt.

20. The method of claim 17 wherein the base is a tertiary amine.

21. The method of claim 17 wherein the base is a hydride salt.

22. The method of claim 17 wherein the base is a carbonate salt.

23. The method of claim 1 wherein the reaction temperature is maintained between about 0° C. and about 25° C.

24. The method of claim 1 wherein the reaction temperature is maintained between about 25° C. and about 200° C.

25. The method of claim 1 wherein the reaction temperature is maintained between 60° C. and about 150° C.

26. The method of claim 1 wherein the reaction pressure is atmospheric pressure.

27. The method of claim 1 wherein the reaction pressure is subatmospheric.

28. The method of claim 1 wherein the reaction pressure is superatmospheric.

29. The method of claim 1 wherein the reaction proceeds via a solution polymerization.

30. The method of claim 29 wherein the reaction solvent is a polar aprotic solvent.

31. The method of claim 29 wherein the reaction solvent is selected from the group consisting of aromatic solvents, aliphatic hydrocarbons, saturated aliphatic ethers, cycloaliphatic ethers and aromatic ethers.

32. The method of claim 29 wherein the reaction solvent is water.

33. A method for producing substituted polyphenylene polymers comprising:
reacting dihaloaryl or polyhaloaryl species in a reaction mixture comprising a solvent and at a selected temperature and pressure in the presence of a supported transition metal catalyst to effect the formation of carbon-carbon bonds between aryl species at the point of former halogen attachment to thereby form a polyphenylene polymer or copolymer, wherein the reaction proceeds via a solution polymerization, and wherein the reaction solvent is a homogeneous mixture of different solvents.

34. A method for producing substituted polyphenylene polymers comprising:
reacting dihaloaryl or polyhaloaryl species in a reaction mixture comprising a solvent and at a selected temperature and pressure in the presence of a supported transition metal catalyst to effect the formation of carbon-carbon bonds between aryl species at the point of former halogen attachment to thereby form a polyphenylene polymer or copolymer, wherein the reaction proceeds via a solution polymerization, and wherein the reaction mixture comprises a heterogeneous mixture of liquids.

35. The method of claim 34 wherein the reaction mixture is an emulsion.

36. The method of claim 34 wherein the reaction mixture is selected from the group consisting of mini-emulsions and micro-emulsions.

37. The method of claim 34 wherein the reaction mixture is a suspension.

38. The method of claim 34 wherein the reaction mixture includes a surfactant that does not contain acidic protons.

39. The method of claim 1 wherein the phase transfer catalyst is an ether or polyether.

40. The method of claim 1 wherein the polyphenylene polymer formed has a degree of polymerization greater than about 20.

41. The method of claim 1 wherein the polyphenylene polymer formed has a degree of polymerization greater than about 40.

42. The method of claim 1 wherein the polyphenylene polymer formed has a degree of polymerization greater than about 60.

43. The method of claim 1 wherein the polyphenylene polymer formed has a degree of polymerization greater than about 80.

44. The method of claim 1 wherein the polyphenylene polymer formed has a degree of polymerization greater than about 100.

45. The method of claim 1 wherein the polyphenylene polymer formed has a degree of polymerization greater than about 120.

46. The method of claim 1 wherein the formed polyphenylene polymer is homopolymer.

47. The method of claim 1 wherein the formed polyphenylene polymer is copolymer.

48. The method of claim 1 wherein the phase transfer catalyst is selected from the group consisting of ethers, glymes, polyglycols and crown ethers.

49. The method of claim 48, wherein the phase transfer catalyst is polyethylene glycol.

50. The method of claim 14 where the phase transfer catalyst is selected from the group consisting of benzyltrimethylammonium halides, benzyltriethylammonium halides, benzyltripropylammonium halides, benzyltributylammonium halides, tetramethylammonium halides, tetraethylammonium halides, tetrapropylammonium halides, tetrabutylammonium halides, triethylbutylammonium halides, tributylethylammonium halides, trimethylhexadecylammonium halides, tetrahexylammonium halides, benzyldimethylalkylammonium halides, cetyltrimethylammonium halides, dimethyldiallylammonium halides, cetylpyridinium halides and laurylpyridinium halides.

51. The method of claim 15 where the phase transfer catalyst is selected from the group consisting of ethyltriphenyiphosphonium halides, butyltriphenylphosphonium halides, methyltriphenylphosphonium halides, tetrabutylphosphonium halides, tetraphenylphosphonium halides and benzyltriphenylphosphonium halides.

52. A method for producing substituted polyphenylene polymers comprising:
reacting dihaloaryl or polyhaloaryl species in a reaction mixture comprising a solvent and at a selected temperature and pressure in the presence of a supported transition metal catalyst to effect the formation of carbon-carbon bonds between aryl species at the point of former halogen attachment to thereby form a polyphenylene polymer or copolymer, wherein the supported transition metal catalyst is selected from the group consisting of palladium on a carbon substrate (Pd(C)) and rhodium on a carbon substrate (Rh(C)).

53. The method of claim 52, wherein the reaction takes place in the presence of a phase transfer catalyst.

54. The method of claim 52, wherein the reaction solvent comprises a homogenous mixture of different solvents.

55. The method of claim 52, wherein the reaction mixture comprises a heterogeneous mixture of liquids.

56. The method of claim 33, wherein the reaction takes place in the presence of a phase transfer catalyst.

57. The method of claim 34, wherein the reaction takes place in the presence of a phase transfer catalyst.

* * * * *

UNITED STATES PATENT AND TRADEMARK OFFICE
CERTIFICATE OF CORRECTION

PATENT NO. : 7,365,146 B2  Page 1 of 1
APPLICATION NO. : 11/045416
DATED : April 29, 2008
INVENTOR(S) : David B. Thomas It is certified that error appears in the above-identified patent and that said Letters Patent is hereby corrected as shown below:

In the Claims

Column 12, line 67, Claim 23    Delete "25°C",
                                Insert --250°C--

Column 14, lines 32-33, Claim 51    Delete "ethyltriphenyiphosphonium",
                                    Insert --ethyltriphenylphosphonium--

Signed and Sealed this

Thirty-first Day of March, 2009

JOHN DOLL
*Acting Director of the United States Patent and Trademark Office*